Aug. 11, 1959
A. SOSS
2,898,679
CLEAVER
Filed Feb. 12, 1958
2 Sheets-Sheet 1
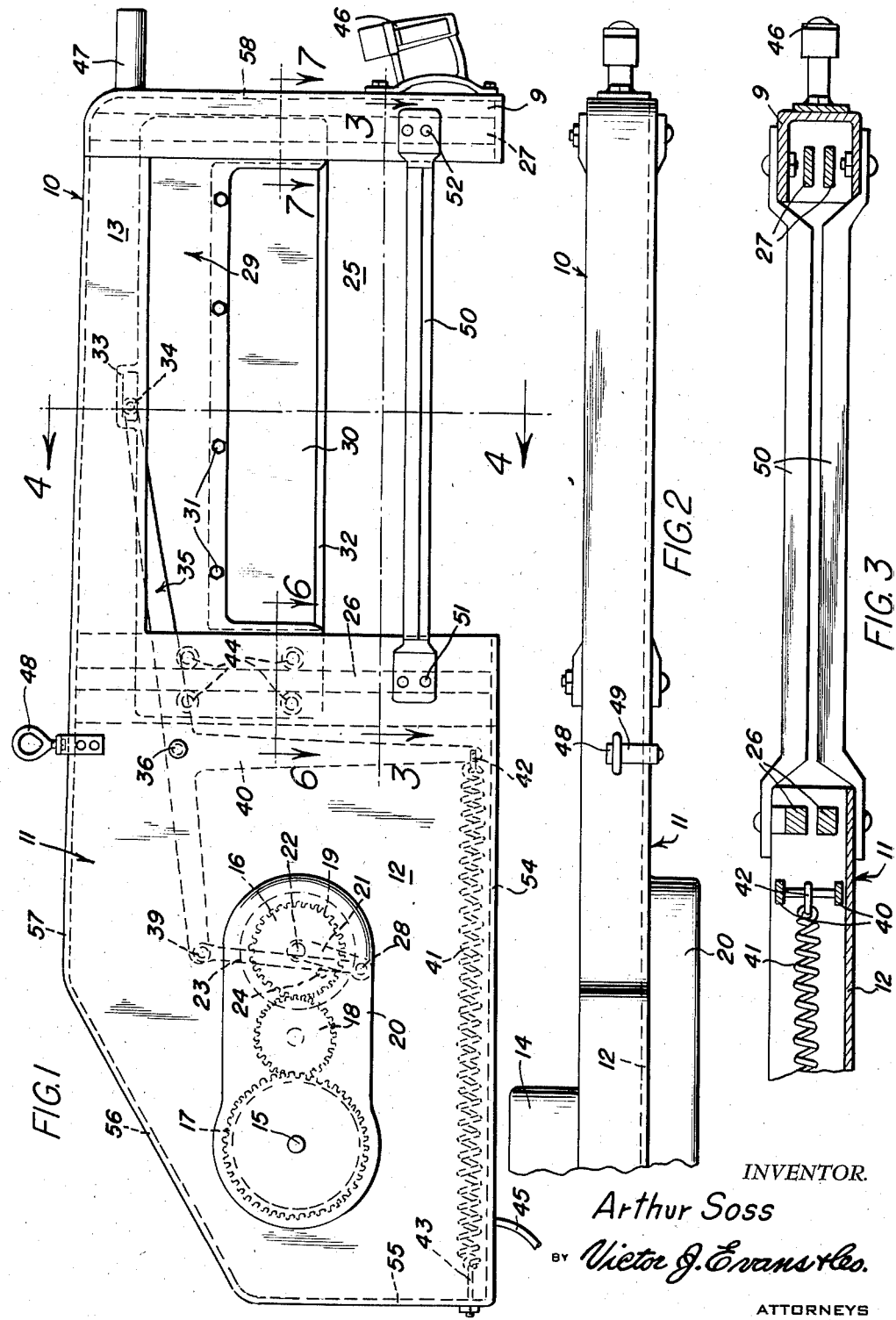
INVENTOR.
Arthur Soss
BY Victor J. Evans & Co.
ATTORNEYS

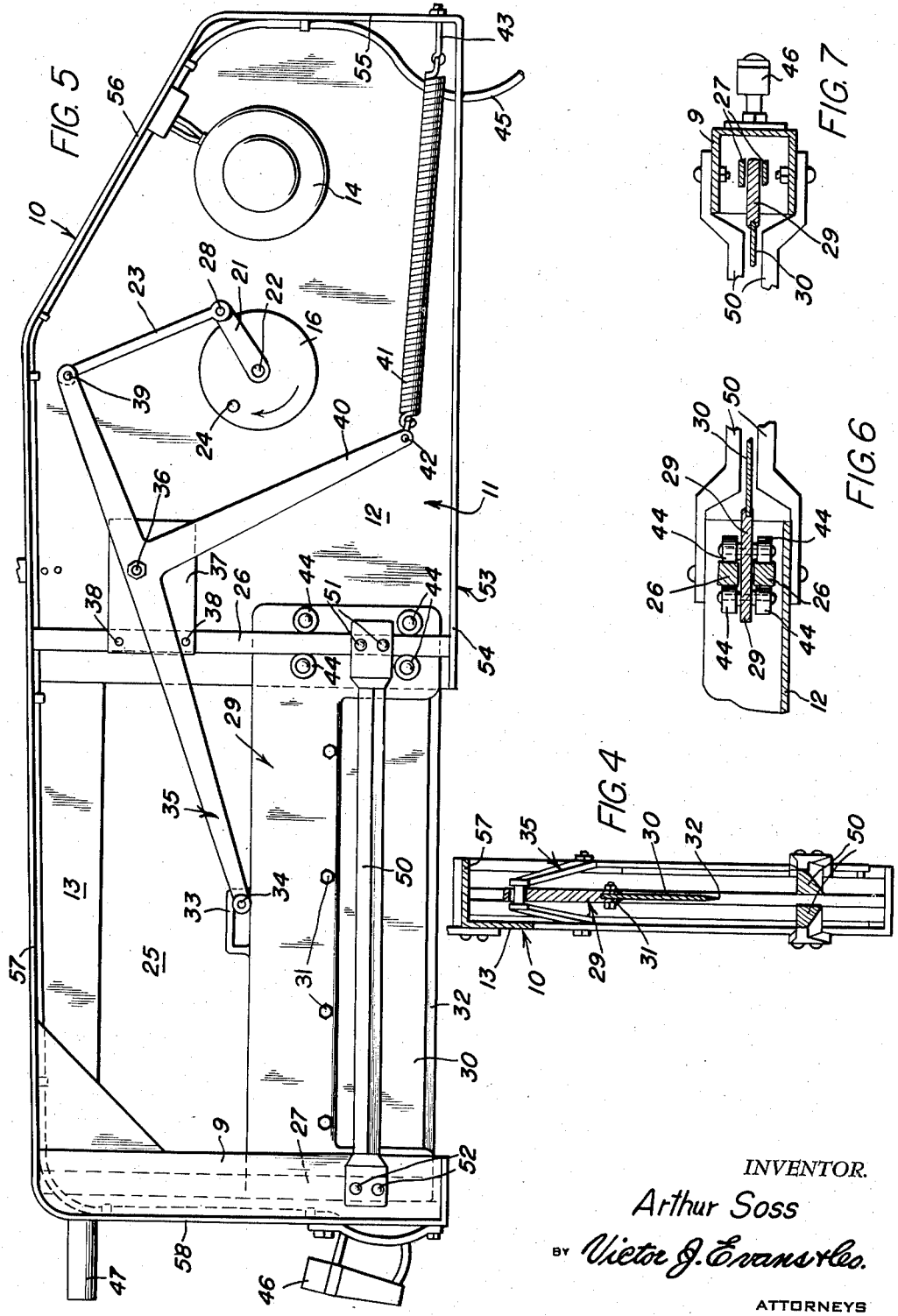

United States Patent Office 2,898,679
Patented Aug. 11, 1959

2,898,679

CLEAVER

Arthur Soss, McCook, Nebr.

Application February 12, 1958, Serial No. 714,841

1 Claim. (Cl. 30—272)

This invention relates to a cleaver or cutting instrument.

This invention is an improvement over the devices shown in my prior Patents Nos. 2,789,310, 2,718,698, 2,718,697, and the present invention is also an improvement over the device shown in my copending application Serial No. 528,786, now Patent No. 2,832,410.

The object of the invention is to provide a cleaver which is adapted to be used for cutting various materials such as meat or carcasses, and wherein there is provided a novel mechanism for actuating the cutting blade or knife.

A further object of the invention is to provide a cleaver which includes a movable cutting blade that is adapted to coact with a pair of stationary crosspieces so that material such as beef or animal carcasses can be readily cut with ease and rapidity.

A further object of the invention is to provide a cleaver which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the cleaver of the present invention.

Figure 2 is a top plan view of the cleaver of the present invention.

Figure 3 is a sectional view taken on the line 3—3 of Figure 1.

Figure 4 is a sectional view taken on the line 4—4 of Figure 1.

Figure 5 is a view looking at the opposite side from Figure 1, and showing the blade in lowered position in contrast to the view of Figure 1 which shows the blade in raised position.

Figure 6 is a sectional view taken on the line 6—6 of Figure 1.

Figure 7 is a sectional view taken on the line 7—7 of Figure 1.

Referring in detail to the drawings, the numeral 10 indicates the cleaver of the present invention, and the cleaver 10 includes a support member which is indicated generally by the numeral 11. The support member 11 embodies a first portion 12 and a second portion 13, and a U-shaped channel section 9 is arranged on one end of the support member 11.

The numeral 14 indicates a conventional electric motor which serves to drive a shaft 15, and there is further provided a wheel or disk 16. A means is provided for driving the disk 16 from the motor 14, and this means comprises a first gear 17 which is mounted on the shaft 15, Figure 1. The gear 17 meshes with a second gear 18, and the gear 18 meshes with a third gear 19 that is suitably connected to the disk 16. The gears 17, 18 and 19 may be arranged in a suitable casing or housing 20.

As shown in the drawings, a link 21 is pivotally connected to the center of the disk 16 as at 22, and an arm 23 is pivotally connected to the link 21 by means of pivot pin 28. A pin 24 is carried by the disk 16, and the pin 24 is mounted for movement into and out of engagement with the link 21 as later described in this application.

The support member 11 is provided with an open space or cutout 25, and arranged adjacent one side of the space 25 is a first pair of spaced parallel bars 26, there being a similar pair of spaced parallel bars 27 adjacent the opposite side of the space 25. The numeral 29 indicates a carriage which is slidably mounted for movement between the bars 26 and 27, and the carriage 29 has a cutting blade or knife 30 secured thereto, as for example by means of securing elements 31. The blade 30 is provided with a sharp cutting edge 32. A yoke 33 is secured to the carriage 29 or formed integral therewith, and a pivotally mounted body member 35 carries a pin 34 which engages the yoke 33. The body member 35 is pivotally connected to a plate 37 by means of a pivot pin or bolt 36, Figure 5, and the plate 37 may be anchored in place by means of securing elements 38. The numeral 39 indicates a pivotal connection between the arm 23 and the end of the body member 35. Levers 40 extend from the body member 35 and are secured thereto or formed integral therewith, and the numeral 41 indicates a coil spring which has one end connected to the levers 40 as at 42, while the other end of the coil spring 41 is anchored in place by means of a securing element 43.

The numeral 44 indicates rollers which are connected to the carriage 29, and the rollers 44 are adapted to engage in bars such as the bars 26 so as to insure that the carriage 29 can freely move when the motor 14 is actuated.

The numeral 45 indicates wires which can be used for connecting the motor 14 to a suitable source of electrical energy, and a manually operable switch 46 is electrically connected to the motor 14 so that the motor 14 can be readily turned on or off. A handle 47 extends from one end of the cleaver, and the numeral 48 indicates an eyelet or eyebolt which can be engaged by a member 49 so as to provide a means whereby the cleaver can be suspended or supported from an overhead location.

As shown in the drawings, there is provided a pair of spaced apart crosspieces 50 which have their ends anchored in place by means of securing elements 51 and 52, and the cutting blade 30 is adapted to pass between the crosspieces 50, as the cutting blade is actuated.

There is further provided a flange which is indicated generally by the numeral 53, and the flange 53 includes portions 54, 55, 56, 57 and 58, as for example as shown in Figure 5.

From the foregoing, it is apparent that there has been provided a cleaver which is an improvement over the prior cleavers such as that shown in my prior Patents Nos. 2,789,310, 2,718,698, 2,718,697, or that shown in my pending application, Serial No. 528,786, now Patent No. 2,832,410.

According to the present invention, the cleaver 10 may be supported from an overhead ceiling or structure by means of a chain or cable which can be connected to the eye-bolt 48, and then with the parts arranged as shown in the drawings, the handle 47 can be gripped and then by arranging the cleaver so that the meat or other material to be cut is in the path of the moving blade 30, it will be seen that the switch 46 can then be manually actuated. The switch 46 will cause rotation or actuation of the motor 14 and as the motor 14 turns, it rotates the shaft 15. Since the shaft 15 is rotated by the motor 14, the gear 17 will turn and since the gear 17 meshes with the gear 18, it will be seen that there will result in rotation of the gear 18. Since the gear 18 meshes with the gear 19, it will be seen that this will cause rotation of the gear 19, the gear 19 being connected to the rotary disk 16. Thus, the disk 16 will rotate in the direction indicated by the arrow in Figure 5, namely, the disk 16 will rotate in a clockwise direction, so that the pin 24 will periodically or selectively rotate with the disk 16 and this pin 24 will engage the link 21 so as to move the link 21 in a clockwise direction. This movement of the link 21 causes corresponding movement of the arm 23 which is connected to the link 21 by means of the pivot pin 28. This pivotal movement of the arm 23 results in pivotal movement of the body member 35 about the pivot pin 36 so that the body member 35 will be pivoted initially in a clockwise direction and since the pin 34 on the end of the body member 35 engages the yoke 33, it will be seen that the carriage 29 will be raised or lifted through the space 25. The carriage 29 is guided by means of the bars 26 and 27, and the carriage 29 has the rollers 44 thereon which help to insure that there will be a smooth movement of the carriage 29 as it moves back and forth or up and down. As the disk 16 continues to rotate, the pin 24 will permit the link 21 to pivot so that the coil spring 41 will return the parts from the position shown in Figure 1 to the position shown in Figure 5. Thus, it will be seen that the coil spring 41 acts as a return spring so as to help urge the carriage 29 from the raised position of Figure 1 to the lowered position of Figure 5, and since the carriage 29 carries the cutting blade 30, it will be seen that this downward movement of the carriage 29 provides a means whereby meat or carcasses or the like can be readily and quickly and efficiently cut or severed. As the disk 16 continues to rotate, the pin 24 again comes around and engages the link 21 so that the cycle of operation is repeated and this will result in the blade 30 moving up and down quickly with a snapping motion so that the cutting edge 32 will provide the necessary cutting of the meat or the like, and this up and down or back and forth cutting motion by the blade will occur as long as the motor 14 is actuated. When the cleaver is no longer needed, the switch 46 can be used to turn off the motor 14 so that the movement of the blade 30 will be discontinued.

The cleaver of the present invention is especially suitable for use with a table for slitting beef or the like.

In Figure 1 the blade 30 is shown at the top position of the cutting stroke, and the blade carriage 29 is guided by the rollers 44. The bars 26 and 27 serve as guides, and as the carriage and blade descend, the blade 30 passes between the crosspieces or bars 50 and begins the cutting operation. The cleaver can rest upon the carcass that is being split and the blade will be guided during the cutting stroke and this is an important feature of the cleaver of the present invention. The blade 30 may travel three inches below the guide bars 50, and these guide bars 50 may rest on the beef being severed or cut.

The power for raising the carriage 29 is provided by means of the motor 14 which rotates the disk 16, and the body member or fulcrum bar 35 is connected to the carriage 29 by means of a bearing 34 engaging the yoke 33. The arms or levers 40 extend downward at right angles to the body member 35 and the spring 41 is connected at the point 42 to the levers 40 and the spring furnishes the necessary power for the cutting stroke. As previously described, when the disk 16 starts to revolve, it carries the link 21 with it by means of the protruding knob or pin 24 until the link 21 moves past the center line and this frees the power of the motor from the body member 35 and permits the carriage and blade to descend on the power stroke by means of the weight of the blade and carriage and also due to the provision of the power spring 41.

Minor changes in shape, size and rearrangement of details coming within the field of invention claimed may be resorted to in actual practice, if desired.

I claim:

In a cleaver, a support member including a first portion, a U-shaped channel section on an end of said support member, a second portion extending from said first portion, a motor arranged contiguous to said first portion, a shaft driven by said motor, a disk rotatably connected to said first portion, means connecting said disk to said shaft, a link pivotally connected to said disk, a pin extending from said disk for selective engagement with said link, an arm pivotally connected to the outer end of said link, said support member being provided with an open space, first and second pairs of spaced parallel bars arranged on opposite sides of the open space, a carriage slidably mounted between said bars, a blade connected to said carriage, a pair of spaced apart crosspieces extending between said first bars and said channel section and connected thereto, rollers connected to said carriage and engaging said bars, a yoke extending from said carriage, a pivotally mounted body member having a pin on one end engaging said yoke, the other end of said body member being pivotally connected to said arm, a lever extending from said body member, and a coil spring having one end connected to said lever and the other end of said coil spring being anchored adjacent an end of said support member.

References Cited in the file of this patent
UNITED STATES PATENTS 2,027,396    Meyer   _____ Jan. 14, 1936